Figure 8:
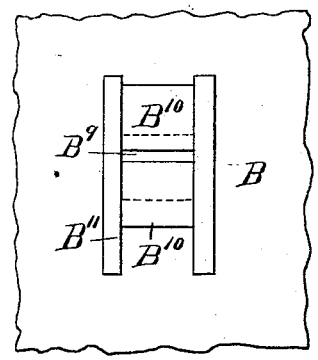

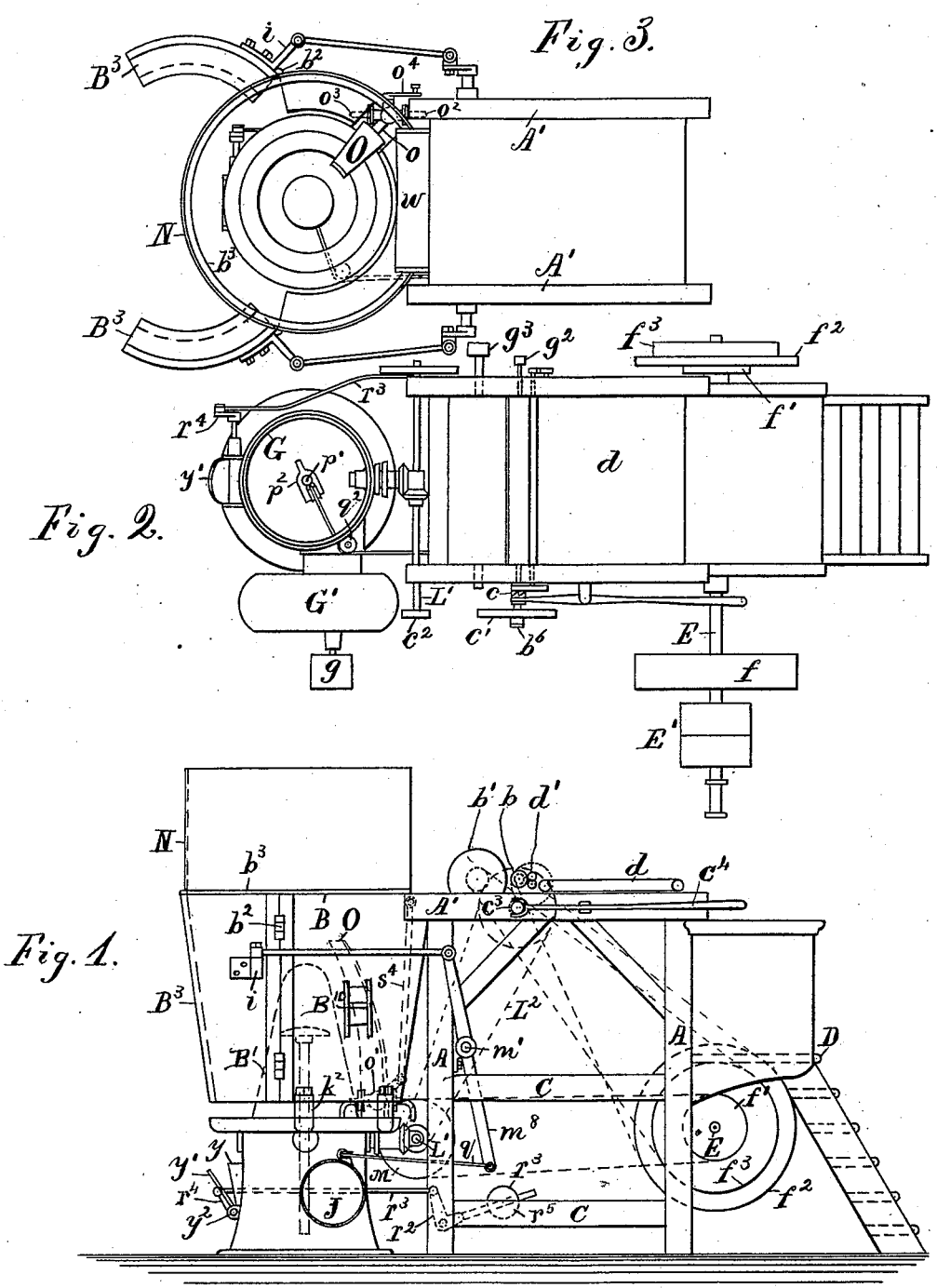

(No Model.) 3 Sheets—Sheet 2.
G. YULE.
HAT FORMING MACHINE.
No. 404,459. Patented June 4, 1889.
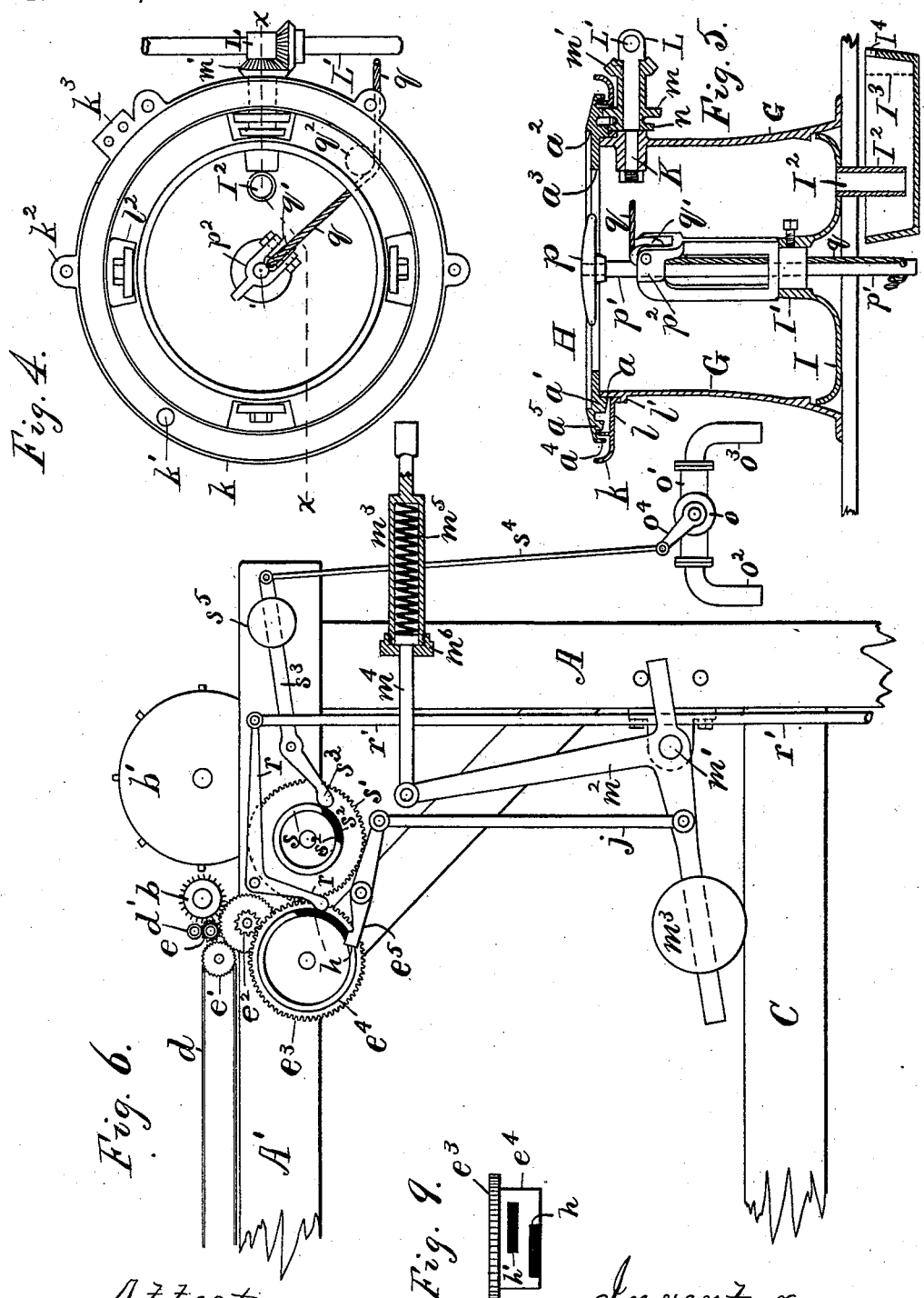
Attest:
W. F. D. Crane.
F. C. Fischer.
Inventor.
George Yule, per
Crane & Miller, Attys.

(No Model.) 3 Sheets—Sheet 3.

G. YULE.
HAT FORMING MACHINE.

No. 404,459. Patented June 4, 1889.

Attest:
L. Lee.
F. C. Fischer.

Inventor.
George Yule, per
Crane & Miller, Attys.

UNITED STATES PATENT OFFICE.

GEORGE YULE, OF NEWARK, NEW JERSEY, ASSIGNOR TO CARRIE G. YULE, OF SAME PLACE.

HAT-FORMING MACHINE.

SPECIFICATION forming part of Letters Patent No. 404,459, dated June 4, 1889.

Application filed August 25, 1887. Serial No. 247,810. (No model.)

*To all whom it may concern:*

Be it known that I, GEORGE YULE, a citizen of the United States, residing at Newark, Essex county, New Jersey, have invented certain new and useful Improvements in Hat-Forming Machines, fully described and represented in the following specification and the accompanying drawings, forming a part of the same.

The object of this invention is to render any style of fur-forming machine entirely automatic throughout, so that the operators may have no duty to perform except the supplying of the feeding-apron with the suitable charge of fur and the removal from the forming-table of the cone with a hat body or bat formed thereon.

In the Gill hat-forming machine the perforated cone for shaping the bat is surrounded by an inclosing-casing, and in my apparatus a spray-discharger is affixed within the casing to wet the bat as soon as it is formed. When thus wet, the vacuum beneath it holds it strongly to the table, and to facilitate its removal therefrom an air-inlet is provided in the vacuum-box beneath the table, and in my present construction is automatically opened at a suitable time to neutralize the atmospheric pressure upon the cone to permit its convenient removal. The air-check mounted within the cone to regulate the distribution of the fur upon its surface also requires to be lowered before the removal of the cone. The doors of the casing also require to be opened for the operator to remove the cone, and the water requires to be supplied to and discharged from the spraying device when the doors are thus opened. The feeding-apron should also be stopped to prevent the accidental supply of fur before the forming-cone is replaced. To effect such objects I provide one or more cams rotated by connection with the driving-shaft of the machine, and by these cams actuate the air-inlet, the doors, the air-check, the spraying device, and the apron-clutch at the proper intervals in the forming process.

Heretofore the fan for producing the vacuum beneath the cone has been located beneath the turn-table or beneath the point where the water would accumulate when supplied to the forming-cone to harden the bat thereon. To facilitate the collection and removal of the water from the vacuum-chamber, I arrange the fan with its inlet above the bottom of said chamber and provide the bottom with a water-tight pan having a suitable waste-pipe. Heretofore the margin or periphery of the turn-table has been included within the casing, and the fur was thus liable to enter the joint formed between the rotating table and the top of the vacuum-chamber and to obstruct the free movement of the table by sticking such joint. To obviate this defect, I contract the top of the vacuum-chamber and form the joint between such chamber and turn-table entirely outside of the apartment in which the fur is blown, and I also form an annular trough beneath the margin of the turn-table and provide the latter with a flange depending into such trough. I also sustain the turn-table upon anti-friction wheels, and form within the trough apertures for such wheels and for the cog-wheel which drives the turn-table to reach, respectively, the plain and toothed rings formed upon the under side of the table to fit such wheels. I also provide the draft-apertures in the casing with two sliding plates to regulate the height and size of the apertures at pleasure. I also provide a guard around the top of the casing, above the doors, and furnish other conveniences for constructing and operating the machine advantageously, all of which will be understood by reference to the annexed drawings, in which—

Figure 7:
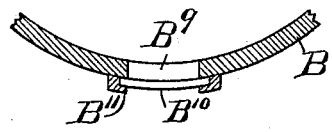

Figure 1 is an elevation of the right-hand side of the machine with the blower and its pulleys removed. Fig. 2 is a plan of the machine with the casing, turn-table, and water-trough removed and the smaller details of the cam mechanism omitted. Fig. 3 is a plan of part of the frame with the feeding and cam mechanisms removed and the device for operating the doors, the air-check, and the water-cock. Fig. 4 is a plan of the vacuum-chamber and water-trough with the driving-gears for operating the turn-table. Fig. 5 is a vertical section of the same on line *x x* in Fig. 4, and Fig. 6 is a side elevation, opposite to that in Fig. 1, of the feeding mechanism, feeding devices, and the cam mechanism for automatically operating the doors, the air-check, the air-inlet, and water-cock. Fig. 7 is a sectional plan of that part of the casing containing the draft-opening; Fig. 8, an elevation of the same, and Fig. 9 an edge view of the cam $e^4$. Figs. 4 and 5 are upon a scale twice that of Fig. 1, and Figs. 6, 8, and 9 upon a still larger scale.

In Fig. 1, A, A', and C are parts of the frame sustaining the feeding devices, and D is the platform upon which the operator stands to apply the fur to the apron $d$.

$d'$ are the feed-rolls, $b$ the picker, and $b'$ the rotary brush which throws the fur from the picker into the casing B, containing the forming-cone B'. A hood would in practice be used to guide the fur from the rotary brush to the casing, but is omitted from the drawing in order to expose the brush.

E is a driving-shaft (shown also in Fig. 2) receiving its motion by fast and loose pulleys E', and provided with pulley $f$ to drive the fan, pulley $f'$ to drive the turn-table, pulley $f^2$ to drive the brush, and pulley $f^3$ to drive the picker.

The fan G' is mounted at the side of the vacuum-chamber G, and is provided with pulley $g$ to receive a belt from the pulley $f$, and the picker and brush are provided, respectively, with pulleys $g^2$ and $g^3$ to receive belts from the pulleys $f^2$ and $f^3$. As shown in Figs. 4 and 5 the vacuum-chamber is of circular form, and has a circular seat $a$ upon its top to receive the turn-table H, the under side of which is provided with a collar $a'$, fitted to the outside of the circular seat to form a concentric guide.

The turn-table is formed on its upper side with a recess $a^2$ to receive the base of the perforated forming-cone, and with a central aperture $a^3$, through which the air is drawn from the cone into the vacuum-chamber by the fan G'.

The inlet J for the fan G' (shown only in Figs. 1 and 2) is formed upon the side of the chamber G, above the bottom, and a pan I is fitted within the bottom of the chamber to receive the water which passes through the cone from the spray-discharger. The water-box has an upturned flange around its margin, a central boss I', and a waste-pipe $I^2$ to discharge the water. The periphery of the turn-table H is sloped downward from the recess $a^2$ and provided upon its under side with a flange $a^4$ to guide the water into an annular trough $k$, the inner flange of which is fitted inside of the flange $a^4$.

The trough is made of cast-iron and formed with a circular support $l$, fitted to the ring $a$, and rests upon a bead $l'$, formed outside of such ring. Such construction facilitates the casting of the trough separately from the vacuum-chamber and the fitting of the two together by a turned joint at the ring. The trough is provided with an outlet-aperture $k'$, (shown only in Fig. 4,) to which a suitable waste-pipe would be attached.

An annular gear $a^5$ is formed by a row of teeth beneath the margin of the turn-table, adjacent to the inner flange of the trough $k$, and apertures $l^2$ are made through the trough at intervals, and a pinion $m$ and anti-friction wheels $n$ are projected through the apertures into contact, respectively, with the gear $a^5$ and the collar $a'$. The wheels $n$ are pivoted upon the outside of the vacuum-chamber, adjacent to the bead $l'$, and the pinion $m$ is combined with one of the wheels $n$ and with a miter-gear $m'$, and fitted to turn loosely upon a stud $k$, which is projected from the vacuum-chamber, and provided upon its outer end with a bearing L to receive the turn-table shaft L'. This shaft is provided with a pulley M to receive a belt from the pulley $f'$, and the rotation of the driving-shaft E thus actuates the turn-table continuously. The margin of the trough $k$ is employed to sustain the casing B and the spray-discharger O, the casing being mounted upon ears $k^2$ and the discharger upon a flange $k^3$, projected, respectively, from the rim of the trough.

The spray-discharger, as described in my patent application, Serial No. 246,175, consists in a thin flat box O, with fine perforations upon one side, and projects upwardly between the casing and the cone B', with its perforations directed toward the cone, and is supplied with water through a pipe $o$, to which a three-way cock $o'$ is attached. A water-pipe $o^2$ and waste-pipe $o^3$ are also connected with the cock, which is provided with a handle $o^4$, by which the cock-plug may be turned to connect the pipe $o$ with either the pipe $o'$ or $o^3$. The water may thus be supplied to the discharger during the wetting of the bat, and may be thereafter drained out of the discharger to check the discharge from the perforations promptly, and thus avoid the leakage of water upon the turn-table when the bat is removed.

The air-check $p$ is mounted upon a spindle $p'$, fitted to guides $p^2$ in a casting attached to the boss I', and is actuated by a cord $q$, which is attached at its lower end to the spindle, and is guided over pulleys $q'$ and $q^2$, pivoted upon the casting and vacuum-chamber, respectively.

Referring to Figs. 1 and 3, $B^3$ are doors formed in its outer side and movable upon hinges $b^2$. The doors are shown closed in Fig. 1 and opened in Fig. 3, as for the removal of the cone, which is omitted in the latter figure. The casing proper and its doors are preferably terminated at the level of the spout $w$, Fig. 3, through which and the hood the fur is discharged by the brush into the casing, and the height of the casing and doors is supplemented by an annular guard N, projected upward above the top of the hood and removable therefrom when desired. The guard is affixed to a metallic ring $b^3$ upon the top of the casing B and catches the fur blown from the hood; and the object of the entire construction is to prevent any fur from being blown out of the doors should they be accidentally opened before the feeding of the bat was completed, the fur which strikes the front of the guard being drawn toward the cone by the vacuum existing within the latter. The air-inlet below the turn-table is formed as an aperture $y$ in the side of the vacuum-chamber, with a door $y'$ mounted upon a shaft $y^2$, by which it can be opened and closed. The means for actuating these different elements, as desired, are constructed as follows: The feeding-apron $d$ is driven by cog-wheel connection (shown only in Fig. 6) to the feed-rolls $d'$, and the fur being placed upon the feeding-apron $d$ is discharged from the hood within the casing, as desired. The turn-table, with its perforated cone, rotates continuously, and the water is turned into the spray-discharger upon the completion of the bat. The water is discharged while the bat makes one or two revolutions, the doors being opened during the discharge of the water to prevent the latter from wetting them, and the water is then turned off. The door $y'$ of the air-inlet is then opened to destroy the atmospheric pressure upon the bat and cone. The doors of the casing may be opened to permit the removal of the cone and its replacement with another to receive a fresh charge of fur. The means for actuating each of these different elements at the right time is shown herein in Fig. 6, consisting in cams and levers having connections with the respective elements to operate them at the desired time. These attachments are not shown in Figs. 1, 2, and 3, as the scale of those figures would not display such small parts with sufficient clearness. A gear-wheel $e$ upon the lower feed-roll meshes with a gear $e'$ to drive the apron $d$, and also operates a gear $e^2$, which meshes with a wheel $e^3$ and drives a cam $e^4$ to actuate the casing to afford access to the cone.

The cam consists in a ring with a notch $h$ in its side, and a lever $e^5$ is fitted with one arm resting upon the periphery of the cam and the other arm connected by a suitable link $j$ to a rock-shaft $m'$ for actuating the casing in the desired manner to expose the cone. The rock-shaft extends across the frame A, and is provided with arms $m^2$, which are linked to arms $i$ upon the doors. A weight $m^3$ operates to press the lever $e^5$ upon the cam and to open the doors when the lever falls into the notch $h$. The doors are thus held open during the desired interval for changing the cone, and the periphery of the cam then moves the lever $e^5$ to raise the weight and close the doors as desired. To prevent injury to the operator or to the doors if anything should obstruct their closing, the arms $m^2$ are connected with the doors by spring-boxes interposed in the connecting-link $m^4$. The boxes are shown of tubular form, containing spiral springs $m^5$, which would be compressed (by the stem of the link $m^4$ sliding through a cap $m^6$) if the doors were obstructed; but any other form of spring-connection may be employed.

In the edge view of the cam $e^4$, Fig. 8, the latter is shown with a notch $h$ turned into view, and a mortise or slot $h'$ is also formed in the rim of the cam at one side of the notch $h$ and farther around upon its periphery, to operate upon a lever $r$ for actuating the inlet-door $y'$.

The lever is pivoted upon the frame A' and connected by a rod $r'$, bell-crank $r^2$, and rod $r^3$ with an arm $r^4$, attached to the shaft $y^2$, upon which the door is mounted.

A weight $r^5$, attached to the bell-crank, serves to hold the door normally closed, while the pressure of the cam serves to force the door open, except when the end of the lever $r$ drops into the slot $h'$. The air-check requires to be open while the doors are opened, and is therefore actuated by connecting the cord $q$ with an arm $m^8$, attached to the rock-shaft $m^7$. The movement of the arm thus operates to lower the air-check when the doors are opened and to elevate the same as the doors are closed. A cam $s$ is mounted upon a stud adjacent to the cam $e^4$ and driven from the gear $e^3$ by gear $s'$, and has a notch $s^2$ formed in its periphery to receive the end of a lever $s^3$ for actuating the handle of the three-way cock $o'$.

The free end of the lever is provided with a weight $s^5$, and is connected with the handle by a link $s^4$, the weight serving to hold the cock normally closed against the water-supply pipe $o^2$ and with the pipe $o$ in open connection with the discharge-pipe $o^3$. The pressure of the cam upon the end of the lever $s^3$ operates to raise the weight $s^5$ and to connect the spray-discharger with the water-supply pipe at the proper moment for the required length of time. With the means thus described the cycle of operations is automatically effected, one operator having merely to place the fur upon the apron when its movement commences, and the other operator being required merely to remove the covered cone from the turn-table to replace it with a fresh one.

The automatic movements heretofore described for the different elements are essential to the rapid and accurate working of a fur-forming machine and avoid the loss of time that is incurred by the inattention of the operator, and thus increase the production of the machine.

The effect of the entire construction operating normally is to actuate all the parts of the machine a certain number of times per hour, and to thus compel the attendants to produce a certain number of bats.

It will be noticed that the means, as the cams $e^4$ and $s$, are operated by a connection with the lower feed-roll $e$, and that their movements may be wholly arrested by disconnecting the feed-roll from the driving-shaft E.

In practice the lower feed-roll is provided at one end with a gear $b^5$, and a pinion for rotating the same is fitted loosely upon a shaft $b^6$, which is provided at its outer end with a clutch $c$ and a pulley $c'$, the latter being operated by belt L² from a pulley c² upon the end of the turn-table shaft L'. The pinion c³ is also provided with clutch-teeth, and a lever c⁴, mounted upon the frame A', is provided with a handle extended toward the platform D within reach of the feeding operator. The feed-roll thus receives its motion from the main driving-shaft E through the intervention of the shaft L' and belt L², and the shifting of the clutch c operates to disconnect the feed-roll from the driving-power and to simultaneously stop the apron D and the cam or cams which automatically actuate the different elements.

It is obvious that a single cam may be arranged to perform all the functions of the cams $e^4$ and $s$ by providing the cam with suitable notches or irregular faces adapted to actuate different levers at the required intervals of time. The clutch $c$ and lever $c^4$ afford the operator the means to arrest the automatic movement of the doors, and to thus prevent their being closed if the operator who removes the cone requires time to make some adjustment of the apparatus or to change the cones employed, or to perform some duty that prevents his following promptly the automatic movements of the machine.

It is obviously immaterial to the automatic working of the machine how the casing be operated for the convenient removal of the forming-cone from the turn-table.

In Fig. 1 are also shown the apertures formed in the side of the casing at different heights to regulate the deposit of fur upon the cone at different points; and my improvement consists partly in providing several of such openings at different heights upon the casing, and also in providing each aperture with two sliding plates movable separately to form an aperture at any desired distance from the bottom of the casing. Such sliding plates may be applied to an aperture in the casing whether it be formed with doors or otherwise.

In Fig. 8, B is the casing; $B^9$, the aperture; $B^{10}$, one of the sliding plates, and $B^{11}$ the flange to hold it in place against the casing. As shown in Figs. 7 and 8, the two plates $B^{10}$ together are long enough to entirely close the aperture, but may have their inner ends separated to any degree, and so arranged as to form a draft-opening of any size at any point in the length of the aperture $B^9$.

A part of my improvements may be applied to bat-forming machines having no casing around the cone, and I do not therefore limit myself exclusively to their use in a Gill forming-machine.

It is obviously immaterial how the doors of the casing be made to close elastically, as the cam $e^4$ may be made to open the doors instead of closing them, and the weight $m^3$ would then be used to close the doors (after they were opened by the cam) when the lever $e^5$ fell into the notch in the cam. Such weight would not operate positively to push the doors against any resistance, and if the operator were in the way the doors would simply be arrested until he moved, and the weight would then complete the desired movement.

Having thus set forth my invention, what I claim herein is—

1. A hat-forming machine comprising a driving-shaft and a casing inclosing a perforated hat-forming cone, doors upon the said casing, and a cam operated by the driving-shaft and connected to the doors, as and for the purpose set forth.

2. A hat-forming machine comprising a driving-shaft and a casing inclosing a perforated hat-forming cone, a spray-discharger located within the casing adjacent to the cone, a water pipe and cock to supply water to the spray-discharger, a cam operated by the driving-shaft, and suitable connections between the cam and the cock to open the cock automatically, as and for the purpose set forth.

3. A fur-forming machine having a casing inclosing the perforated cone, a spray-discharger located within the casing adjacent to the cone, a water pipe and cock to supply water to the spray-discharger, an air-inlet in the vacuum-chamber beneath the turn-table, a driving-shaft, and a cam operated by the driving-shaft and connected with the air-inlet, as and for the purpose set forth.

4. A fur-forming machine having a casing inclosing the perforated cone, a spray-discharger located within the casing adjacent to the cone, a water pipe and cock to supply water to the spray-discharger, an air-inlet in the vacuum-chamber beneath the turn-table, an air-check vertically movable within the cone, a driving-shaft, and a cam operated by the driving-shaft and connected with the air-check, as and for the purpose set forth.

5. A fur-forming machine comprising a turn-table, a casing inclosing the same, a feeding-apron, pickers, brush for supplying fur to the cone, and a clutching mechanism connecting the feeding-apron with the driving-shaft and operated to disconnect the apron at intervals corresponding with the feeding of one bat, as and for the purpose set forth.

6. A fur-forming machine comprising the driving-shaft, a casing inclosing the perforated cone, a spray-discharger located within the casing adjacent to the cone, a water pipe and cock to supply water to the spray-discharger, and a cam operated by the driving-shaft and connections to the cock and connections to the doors of the casing, the whole arranged and operated substantially as set forth.

7. A fur-forming machine comprising a driving-shaft, a casing inclosing the perforated cone, a spray-discharger located within the casing and adjacent to the cone, a water pipe and cock to supply water to the spray-discharger, an air-inlet in the vacuum-chamber beneath the turn-table, and a cam operated by the driving-shaft and connections to the water-cock of the spray-discharger and to the doors of the casing, the whole arranged and operated substantially as set forth.

8. A fur-forming machine comprising a driving-shaft, a casing inclosing the perforated cone, a spray-discharger located within the casing adjacent to the cone, a water pipe and cock to supply water to the spray-discharger, an air-inlet in the vacuum-chamber beneath the turn-table, an air-check vertically movable within the cone, and a cam operated by the driving-shaft and connections to the water-cock of the spray-discharger, to the air-inlet, to the air-check, and to the doors of the casing, the whole arranged and operated substantially as set forth.

9. A fur-forming machine comprising a driving-shaft, a casing inclosing the perforated cone, a spray-discharger located within the casing adjacent to the cone, a water pipe and cock to supply water to the spray-discharger, an air-inlet in the vacuum-chamber beneath the turn-table, an air-check vertically movable within the cone, a clutching mechanism connecting the feeding-apron with the driving-shaft, and a cam operated by the driving-shaft and connections to the water-cock of the spray-discharger, to the air-inlet, to the air-check, to the said clutching mechanism, and to the doors of the casing, the whole arranged and operated substantially as set forth.

10. A fur-forming machine having a turn-table and a casing inclosing the same, hinged doors in the casing, and a removable annular shield applied to the top of the casing above the doors, as and for the purpose set forth.

11. A fur-forming machine having a turn-table and a casing inclosing the same, hinged doors in the casing, a cam operated by the driving-shaft of the machine, a lever actuated by the cam for moving the doors, and a spring-connection between the lever and the doors for closing the doors elastically, as and for the purpose set forth.

12. A fur-forming machine provided with a rotary turn-table, a casing and a spray-discharger within the casing, and having sundry movable attachments, (as the hinged doors upon the casing, the air-check, and a pipe and cock for supplying water to the spray-discharger,) and a driving-shaft to actuate the fur-forming cone, cams operated by the driving-shaft, with connections to automatically actuate such attachments, and a clutch for disconnecting the cams from the driving-shaft, as and for the purpose set forth.

13. A fur-forming machine having a turn-table, a casing inclosing the same, and a vertical draft-aperture in the casing provided with two sliding plates adapted to form an opening variable in height from the bottom of the casing, as and for the purpose set forth.

14. A fur-forming machine having a turn-table, a vacuum-chamber sustaining the same and provided with an air-inlet in the side above the bottom of the chamber, and a suction-blower at the side of the vacuum-chamber and connected with such inlet, as and for the purpose set forth.

15. A fur-forming machine having a turn-table, a vacuum-chamber sustaining the same and provided with an air-inlet in the side above the bottom and a water-pan in the bottom of the chamber, a spray-discharger adjacent to the turn-table, and a suction-blower at the side of the vacuum-chamber, as and for the purpose set forth.

16. In a fur-forming machine, the combination, with the turn-table and a vacuum-chamber sustaining the same, of a spray-discharger sustained adjacent to the turn-table and a water-trough beneath the margin of the turn-table, as and for the purpose set forth.

17. In a fur-forming machine, the combination, with the turn-table and a vacuum-chamber sustaining the same, of a casing inclosing the turn-table, a spray-discharger within the casing, and a water-trough beneath the margin of the turn-table, as and for the purpose set forth.

18. A fur-forming machine comprising a turn-table and a vacuum-chamber sustaining the same, a spray-discharger sustained adjacent to the turn-table, a water pipe and cock to supply water to the spray-discharger, and a cam operated by the driving-shaft of the machine and connections to the water-cock, as and for the purpose set forth.

19. In a fur-forming machine, the combination, with the turn-table, of a vacuum-chamber having a circular seat upon its top, a collar upon the turn-table fitted to such seat, an annular water-trough fitted to such top beneath the rim of the turn-table, and a casing inclosing the turn-table and sustained by the water-trough, as and for the purpose set forth.

20. In a fur-forming machine, the combination, with the turn-table, of a vacuum-chamber having a circular seat upon its top, a collar upon the turn-table fitted to such seat, an annular water-trough fitted to such top beneath the rim of the turn-table, and anti-friction wheels pivoted to the vacuum-chamber and fitted to the collar between the trough and the seat, as and for the purpose set forth.

21. In a fur-forming machine, the combination, with the turn-table, of a vacuum-chamber having a circular seat upon its top, a collar upon the turn-table fitted to such seat, an annular gear formed upon the turn-table outside such collar between the water-trough and the seat, and anti-friction wheels and a rotating pinion fitted to the said collar and annular gear between the annular trough and the seat, as and for the purpose set forth.

22. A fur-forming machine comprising a turn-table, a vacuum-chamber of circular form, a water-pan fitted within the bottom and curved upwardly at its center and periphery, guides sustained upon the center of the pan, and a movable spindle fitted to the guides and provided at the top with the air-check $p$, as and for the purpose set forth.

23. A fur-forming machine comprising a turn-table, a vacuum-chamber of circular form, a water-pan fitted within the bottom and curved upwardly at its center and periphery, a circular seat upon the top of the vacuum-chamber, a collar upon the turn-table fitted to such seat, a bead projected from the seat below the collar, and a water-trough arranged beneath the periphery of the turn-table and having a circular support fitted to the seat and resting upon the bead, as and for the purpose set forth.

24. A fur-forming machine comprising a turn-table and a vacuum-chamber sustaining the same, a spray-discharger adjacent to the turn-table, a water pipe and cock to supply water to the spray-discharger, an air-inlet in the vacuum-chamber beneath the turn-table, and a cam operated by the driving-shaft of the machine and connected with the air-inlet, as and for the purpose set forth.

In testimony whereof I have hereunto set my hand in the presence of two subscribing witnesses.

GEORGE YULE.

Witnesses:
JAMES C. MAHON,
THOS. S. CRANE.